Nov. 14, 1961    N. M. BARTLETT    3,008,579
FRUIT GRADERS

Filed Oct. 25, 1960    3 Sheets-Sheet 1

INVENTOR
NORMAN M. BARTLETT

BY: Fetherstonhaugh & Co
ATTORNEYS

Nov. 14, 1961  N. M. BARTLETT  3,008,579
FRUIT GRADERS
Filed Oct. 25, 1960  3 Sheets-Sheet 2

INVENTOR
NORMAN M. BARTLETT
BY: Fetherstonhaugh & Co
ATTORNEYS

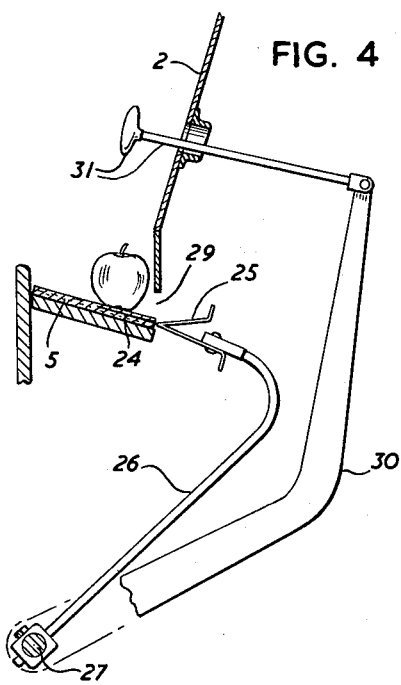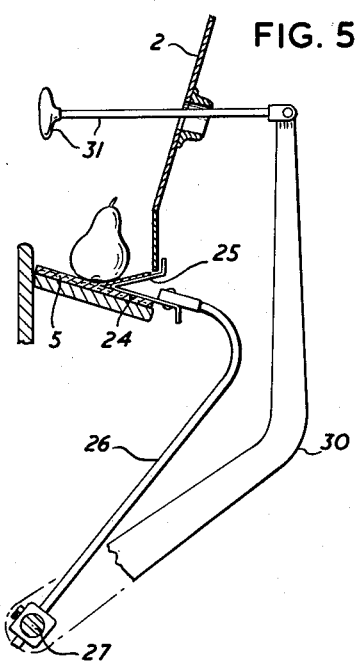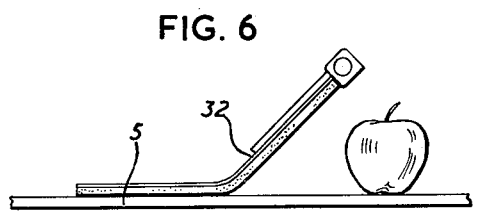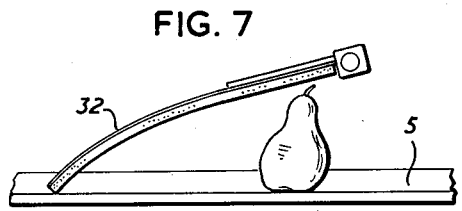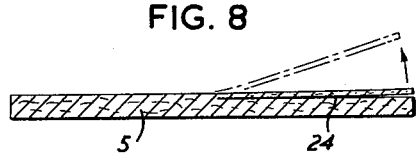
INVENTOR
NORMAN M. BARTLETT

United States Patent Office 3,008,579
Patented Nov. 14, 1961

3,008,579
FRUIT GRADERS
Norman M. Bartlett, P.O. Box 490, Beamsville,
Ontario, Canada
Filed Oct. 25, 1960, Ser. No. 64,942
10 Claims. (Cl. 209—91)

My invention relates to improvements in fruit grading and sizing machines and an object of the invention is to devise an improved machine which will accurately size a large variety of fruits, such as apples, pears, peaches, etc., without bruising during the sizing operation.

Another object of the invention is to provide a sizing arrangement having an endless belt, upon which fruit is carried in combination with a plurality of fruit sizing and ejecting elements formed of synthetic foamed rubber-like material and positioned above the belt in adjustable spaced relation thereto, one side portion of the belt being split whereby its upper face may be positioned in concave form for carrying long shaped fruit, such as pears, and alternately positioned in flat form for carrying round fruit such as apples or peaches.

A further object of the invention is to provide a circular power driven slowly rotating table at the ejection point of each fruit sizing element to receive the ejected fruit upon its surface.

With the foregoing and other objects in view which will appear as the specification proceeds, my invention consists, in its preferred embodiment, of the construction and arrangement all as hereinafter more particularly described and illustrated in the accompanying drawings, in which:

FIG. 4 is a broken away detail transversely of the machine in cross-section through the fruit carrying belt and showing the belt in its flat form carrying round fruit.

FIG. 5 is a similar view to FIG. 4 and showing the belt in its concave or trough form carrying long shaped fruit.

FIG. 6 is a detail showing a swingable flap mounted above the fruit carrying belt and adjusted to turn round fruit into the required position.

FIG. 7 is a similar view to FIG. 6 and showing the swingable flap adjusted to turn long shaped fruit into the required position, and FIG. 8 is an enlarged cross-sectional view through the belt.

Figure 1:
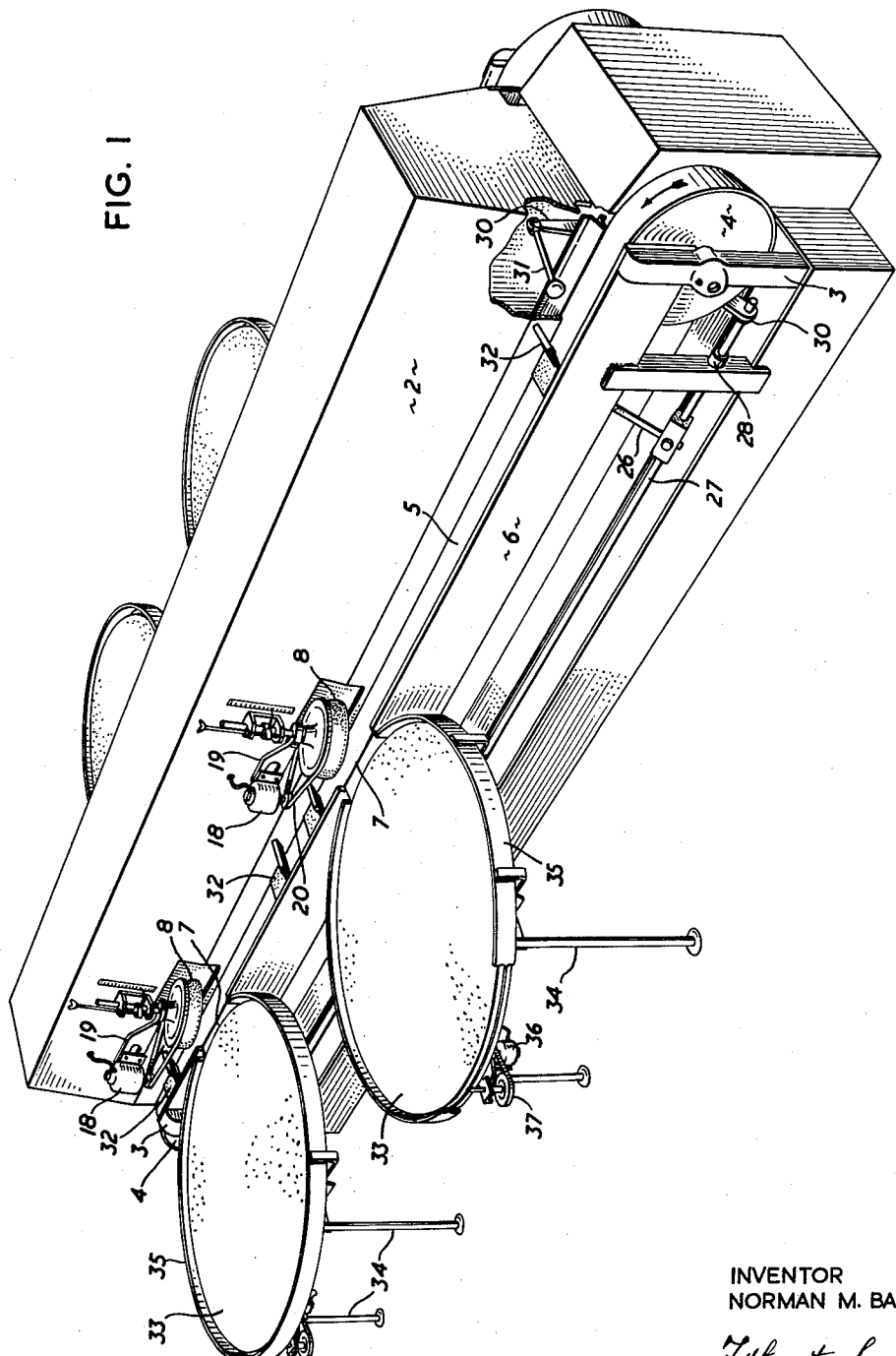
FIG. 1 is a perspective view of a two station sizer machine.

The machine illustrated is of the two sided type, the mechanism on the near side sorting fruit into different size lots and the mechanism on the far side operating in the same manner and effecting the same result. In setting out the invention it is therefore only necessary to describe the near side mechanism which is shown in full.

The main frame of the machine (not shown) is enclosed within a casing 2 and formed with side extension members 3 supporting a pair of belt pulleys 4 positioned at the ends of the machine and carrying an endless horizontal fruit conveyor belt 5 extending along the side of the casing 3, one of the pulleys being suitably driven to travel the belt in the direction indicated by the arrow. The belt travels between the side of the casing 2 and a side plate 6 extending in parallel relation thereto and formed with gaps 7 through which fruit is discharged upon being sized.

Figure 2:
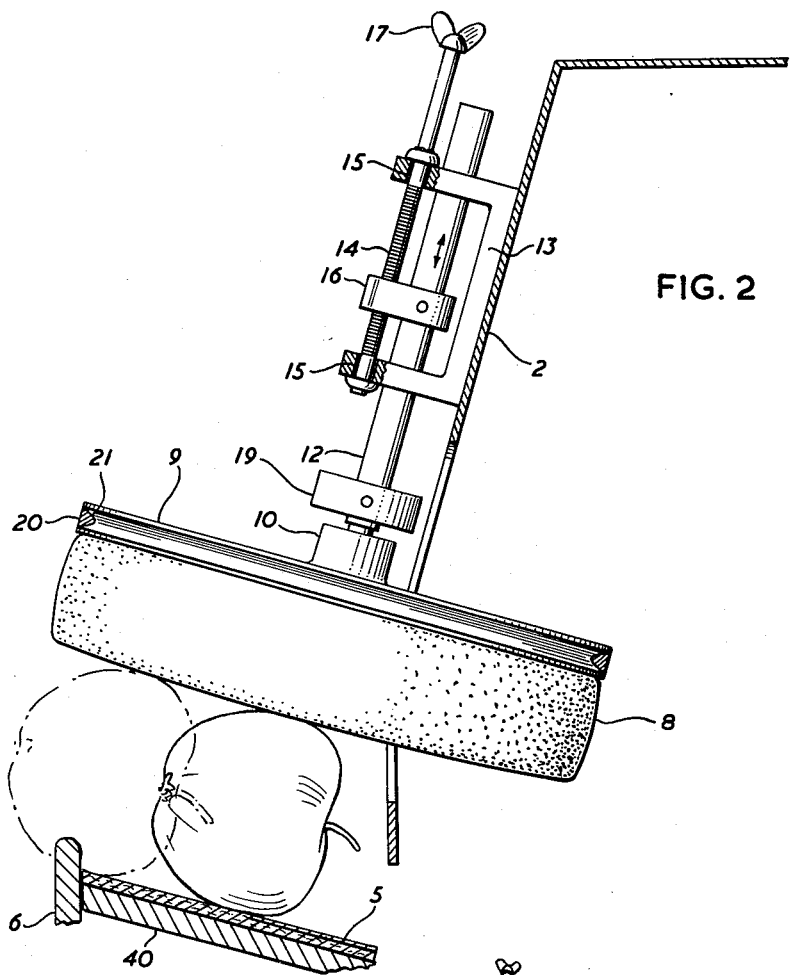
FIG. 2 is an enlarged side elevational view of one of the rotatable fruit sizing and ejecting elements.
Figure 3:
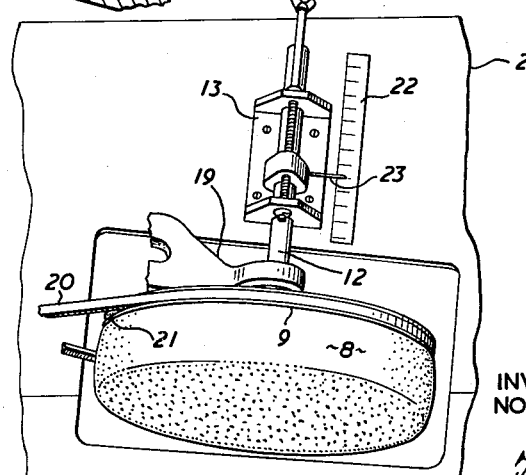
FIG. 3 is a front elevational view of the element shown in FIG. 2.

The fruit sizing elements are individually driven and located in spaced apart relationship above the conveyor belt, and mounted upon the face of the casing 2. The elements, as more particularly illustrated in FIGS. 2 and 3, are similar in construction and arrangement and each comprise a cylindrical fruit sizing and ejector disc 8 formed of synthetic rubber-like sponge material and cemented to the under face of a metal disc 9 mounted for free rotation upon an end and side thrust ball race bearing 10 carried upon the lower end of a shaft 12 slidably mounted within the legs of U-shaped bracket 13 secured to the face of the casing 2. A manually turnable threaded rod 14 is carried within bearings 15 in the bracket 13 and extends in parallel relation to the shaft, the rod being threaded through a block 16 attached to the shaft 12. It will thus be seen that manual actuation of the wing rod head 17 will raise or lower the shaft 12 and fruit sizing disc 8 depending upon the direction of the rod's rotation.

The disc 9 and sizing disc 8 are rotated in a clockwise direction by an electric motor 18 mounted upon an arm 19 attached to the post 12 and whereby the motor moves upwardly or downwardly in unison with the post and sizer disc 8. A V-belt 20 provides the drive between the motor and the disc 9, extending from a pulley upon the motor shaft around a recess 21 in the rim of the disc. For calibration of height of the ejector disc 8 above the fruit conveyor belt 5 a scale 22 is mounted upon the casing 2 in relation to a pointer 23 mounted upon the block 16 and which moves in unison with vertical adjustment of the disc height.

Referring more particularly to FIGS. 4, 5 and 8, the fruit conveyor belt 5 is so constructed that it may be readily formed from a flat face type into a trough or concave face type while being carried upon flat faced pulleys. This important feature of the invention is attained by providing a belt which is inclined transversely in a downward direction towards the casing 2, as shown in FIGS. 4 and 5 wherein the belt slides upon an inclined strip 40 extending lengthwise of the machine, the lower side edge of the belt being formed with an endless slit 24 extending inwardly therefrom to the vicinity of the center of the belt's width. For carrying and positioning round wheeling fruit, such as apples, the belt is run in the flat position as shown in FIG. 4, and for carrying long shaped fruit, such as pears, the belt is brought into trough or concave form as shown in FIG. 5. To change the belt in form, a V-shaped member 25 extending parallel to the slit edge of the belt is provided and mounted upon the extremities of several arms 26 extending upwardly from a shaft 27 supported within bearings 28 and extending lengthwise of the casing. The shaft is manually turnable whereby the member 25 may be moved through a slot 29 in the casing from the position shown in FIG. 4 and into the slit 24 in the belt to bring it into concave form, as shown in FIG. 5. For turning the shaft 27 an arm 30 is secured thereto and carries a manual pull and thrust handle and rod member 31 extending through an opening in the casing 2.

FIG. 6 shows the belt in flat form carrying round wheeling fruit and FIG. 7 in concave form carrying long shaped fruit, these figures also showing sponge rubber surfaced flaps 32 hinged to the wall of the casing 2 and which engage the fruit on the belt conveyor to turn it into required position. The belt is inclined slightly downwardly towards the casing 2 as shown in FIGS. 4 and 5.

For reception of rejected fruit similar rotating tables are positioned exteriorly of the gaps 7 in the side plate 6. These tables each comprise a flat circular foam rubber covered table top 33 rotatably mounted upon a stand 34 and surrounded by a stationary rim 35. The table top is slowly rotated by an electric motor 36 driving a pulley 37 by means of a V-belt, the pulley being mounted upon a rotatable spindle 37 which frictionally engages the edge of the table and slowly rotates the table to carry fruit deposited thereon away from the gap 7 for convenient handling by the fruit packing personnel.

The fruit sizing and ejecting discs 8 are so disposed that they are substantially parallel to the laterally inclined fruit conveyor belt 5, as shown in FIG. 2, and are also somewhat inclined to the path of travel of the belt, as shown in FIG. 3, whereby their edge portions with which fruit carried by the belt first makes contact are closer to the belt than their opposite sides, so that fruit of a sufficiently large size to be engaged by a disc is immediately brushed off the belt by the disc as shown in FIG. 2. Fruit of smaller size than the distance between the disc and the belt passes under the disc to the next disc which is closer to the belt, and so on depending upon the number of sizing discs in the machine.

Another reason for inclining the belt 5 laterally is to direct round fruit to wheel about its axis or core in approaching a sizing disc as fruit is sized by diameter rather than height. In practice fruit is fed into the fruit carrying belts 5 from chutes, not shown, and overlying the belts at the feeding end of the machine, undersize fruit passing beneath the several sizing discs 8 to be deposited in a suitable receptacle, not shown, at the far end of the machine as the belts are carried downwardly over their pulleys 4.

In grading fruit for market, official fruit grading specifications require that fruit be graded according to its maximum diameter transversely of the core of the fruit, and it is therefore necessary to so position fruit upon a conveyor belt approaching a measuring or grading element that it is lying upon its side and in position to be engaged by the element and rolled off the belt transversely of the path of travel of the belt. In the case of globular fruits such as oranges and apples no great problem is presented in rolling the fruit from off a flat belt, but this is not true in handling long shaped fruit such as pears and lemons where the fruit to be free of grading damage must be rolled off the belt axially of its core as otherwise it could only be rolled end over end with resultant squeezing and deformation by the action of the grading element. It is therefore required that the fruit in approaching the grading element be so positioned upon the belt that its core is substantially parallel to the path of movement of the belt, and whereby it is in position to roll off the side of the belt axially of its core. It will thus be appreciated that the provision of my concave belt 5 insures that long shaped fruit when carried upon the belt and nudged into position wherein its core is horizontal, as by the flap 32, will on account of its shape roll into position lengthwise of the trough of the belt to remain in such position until engaged and ejected by the grading element.

From the foregoing description it will be apparent that in providing a belt which may be quickly altered from flat to concave form, I have provided a machine capable of handling a broad range of fruits and furthermore by providing slowly rotating tables for reception of sized brushed off fruit I have in addition provided an arrangement by which sized fruit is gently carried away from the machine into the hands of the fruit packing personnel without any possibility of scraping or bruising.

Furthermore by forming the discs 8 of the fruit sizing elements of synthetic sponge-like material, the discs remain constant in size and configuration irrespective of changes in temperature or humidity thereby giving a constant sizing operation, positive fruit ejection and long wearing characteristics.

What I claim as my invention is:

1. In a fruit sizing machine, a substantially horizontally extending driven endless conveyor belt upon which fruit to be graded in size is deposited, a driven rotatable disc-like resilient element mounted above the belt in spaced relationship thereto for brushing fruit of a predetermined size in a lateral direction off the belt, and means for altering the fruit carrying face of the belt from flat form to concave form for the purpose specified.

2. A fruit sizing machine as defined in claim 1, wherein the belt is sloped downwardly transversely of its path of travel, the means for altering the fruit carrying face of the belt from flat form to concave form being an endless slit extending inwardly of the thickness of the belt from its lowermost side edge towards its central portion and a moveable wedge member having its apex extending lengthwise of the slitted side edge of the belt and moveable transversely of the path of travel of the belt to enter the slit and lift the portion of the belt above the slit upwardly to an inclination opposed to the transverse inclination of the remaining portion of the belt.

3. A fruit sizing machine as defined in claim 1, wherein a plurality of driven rotatable disc-like elements are mounted in spaced relationship to each other above the belt conveyor to each rotate in a plane inclined slightly downwardly and forwardly towards the fruit receiving end of the belt with respect to its forward path of movement and for brushing off fruit of predetermined sizes laterally thereof, the sizing elements being successively graded downwardly in height above the conveyor belt from the maximum height of the sizing element nearest the point of deposit of the fruit upon the conveyor belt.

4. A fruit sizing machine as defined in claim 1, wherein a plurality of driven rotatable disc-like elements are mounted in spaced relationship to each other above the belt conveyor to each rotate in a plane inclined slightly downwardly and forwardly towards the fruit receiving end of the belt with respect to its forward path of movement and for brushing off fruit of predetermined sizes laterally thereof, the sizing elements being successively graded downwardly in height above the conveyor belt from the maximum height of the sizing element nearest the point of deposit of the fruit upon the conveyor belt, the belt being sloped downwardly transversely of its path of travel, the means for altering fruit carrying face of the belt from flat form to concave form being an endless slit extending inwardly of the thickness of the belt from its lowermost side edge towards its central portion and a moveable wedge member having its apex extending lengthwise of the slitted side edge of the belt and moveable transversely of the path of travel of the belt to enter the slit and lift the portion of the belt above the slit upwardly to an inclination opposed to the transverse inclination of the remaining portion of the belt.

5. A fruit sizing machine as defined in claim 1, wherein a rotated circular table top is positioned alongside the conveyor belt adjacently to the rotatable disc-like member and upon which fruit brushed off the belt by said member is received.

6. A fruit sizing machine as defined in claim 1, wherein the belt is sloped downwardly transversely of its path of travel, the means for altering the fruit carrying face of the belt from flat form to concave form being an endless slit extending inwardly of the thickness of the belt from its lowermost side edge towards its central portion and a moveable wedge member having its apex extending lengthwise of the slitted side edge of the belt and moveable transversely of the path of travel of the belt to enter the slit and lift the portion of the belt above the slit upwardly to an inclination opposed belt above the slit upwardly to an inclination opposed to the transverse inclination of the remaining portion of the belt, and wherein a rotated circular table top is positioned alongside the conveyor belt adjacently to the rotatable disc-like member and upon which fruit brushed off the belt by said member is received.

7. A fruit sizing machine as defined in claim 1, wherein a plurality of driven rotatable disc-like elements are mounted in spaced relationship to each other above the belt conveyor to each rotate in a plane inclined slightly downwardly and forwardly towards the fruit receiving end of the belt with respect to its forward path of movement and for brushing off fruit of predetermined sizes laterally thereof, the sizing elements being successively graded downwardly in height above the conveyor belt from the maximum height of the sizing element nearest the point of deposit of the fruit upon the conveyor belt, the belt being sloped downwardly transversely of its path of travel, the means for altering the fruit carrying face of the belt from flat form to concave form being an endless slit extending inwardly of the thickness of the belt from its lowermost side edge towards its central portion and a moveable wedge member having its apex extending lengthwise of the slitted side edge of the belt to enter the slit and lift the portion of the belt above the slit upwardly to an inclination of the remaining portion of the belt, a plurality of rotated circular table tops positioned alongside the conveyor belt each adjacent to a rotatable disc-like element and upon which fruit brushed off the belt by the elements is received.

8. A fruit sizing machine as defined in claim 1, wherein a rotated circular table top is positioned alongside the conveyor belt adjacently to the rotatable disc-like member and upon which fruit brushed off the belt by said member is received, and a rotatable motor driven element frictionally engaging the rim of the table top to rotate the table top.

9. In a fruit sizing machine, a substantially horizontally extending driven endless conveyor belt upon which fruit to be graded in size is deposited, a driven rotatable disc-like resilient element mounted above the belt in spaced relationship thereto for brushing fruit of a predetermined size in a lateral direction off the belt, and means for altering the fruit carrying face of the belt from flat form to concave form for the purpose specified, an upwardly extending shaft upon the lower end of which the disc-like resilient element is mounted for free rotation, a bracket upon which the shaft is slidably mounted, a manually turnable threaded rod mounted upon the bracket in parallel relation to the shaft and retained against vertical movement, a block secured to the shaft and having an orifice through which the rod is threaded, a bracket moveable in unison with the shaft, a motor mounted upon the bracket, and drive means extending from the motor to rotate the disc-like resilient element.

10. A fruit sizing machine as defined in claim 1, wherein the belt is sloped downwardly transversely of its path of travel, the means for altering the fruit carrying face of the belt from flat form to concave form being an endless slit extending inwardly of the thickness of the belt from its lowermost side edge towards its central portion and a moveable wedge member having its apex extending lengthwise of the slitted side edge of the belt and moveable transversely of the path of travel of the belt to enter the slit and lift the portion of the belt above the slit upwardly to an inclination opposed to the transverse inclination of the remaining portion of the belt, an upwardly extending shaft upon the lower end of which the disc-like resilient element is mounted for free rotation, a bracket upon which the shaft is slidably mounted, a manually turnable threaded rod mounted upon the bracket in parallel relation to the shaft and retained against vertical movement, a block secured to the shaft and having an orifice through which the rod is threaded, a bracket moveable in unison with the shaft, a motor mounted upon the bracket, and drive means extending from the motor to rotate the disc-like resilient element.

References Cited in the file of this patent

UNITED STATES PATENTS

| 909,413 | Huntley | Jan. 12, 1909 |
| 1,706,368 | Wayland | Mar. 19, 1929 |
| 1,992,838 | Redden | Feb. 26, 1935 |